US009654952B2

(12) United States Patent
Nasir et al.

(10) Patent No.: US 9,654,952 B2
(45) Date of Patent: May 16, 2017

(54) PERSONAL EMERGENCY MESSAGE FRAMEWORK

(71) Applicant: Verizon Patent and Licensing Inc., Basking Ridge, NJ (US)

(72) Inventors: Azim Nasir, Foxboro, MA (US); Andre R. Turner, Belmont, MA (US); Hong Xiao, Acton, MA (US); Dongchen Wang, Concord, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 287 days.

(21) Appl. No.: 13/964,607

(22) Filed: Aug. 12, 2013

(65) Prior Publication Data

US 2015/0044983 A1    Feb. 12, 2015

(51) Int. Cl.
*H04W 4/22* (2009.01)
*H04L 12/58* (2006.01)
*G06F 3/048* (2013.01)
*H04M 3/00* (2006.01)
*H04L 12/18* (2006.01)
*H04L 29/08* (2006.01)
*H04W 4/02* (2009.01)
*H04W 76/00* (2009.01)

(52) U.S. Cl.
CPC .............. *H04W 4/22* (2013.01); *G06F 3/048* (2013.01); *H04L 12/1895* (2013.01); *H04L 12/58* (2013.01); *H04L 51/38* (2013.01); *H04L 67/24* (2013.01); *H04M 3/00* (2013.01); *H04M 2242/04* (2013.01); *H04W 4/02* (2013.01); *H04W 76/007* (2013.01)

(58) Field of Classification Search
CPC .................................................. H04W 76/007
USPC ...... 455/466, 404.1–404.2, 424, 456.1–456.6
See application file for complete search history.

(56) References Cited

U.S. PATENT DOCUMENTS

| | | | |
|---|---|---|---|
| 8,013,734 B2* | 9/2011 | Saigh et al. ............... | 455/404.1 |
| 8,270,939 B2* | 9/2012 | Imming et al. ............. | 455/404.2 |
| 8,923,805 B2* | 12/2014 | Single ........................ | 455/404.2 |
| 2004/0248597 A1* | 12/2004 | Mathis ......................... | 455/466 |
| 2006/0058002 A1* | 3/2006 | Bachelder ..................... | 455/344 |
| 2006/0258369 A1* | 11/2006 | Burroughs et al. ......... | 455/456.1 |
| 2007/0238454 A1* | 10/2007 | Chambers ............. | H04W 68/00 455/422.1 |
| 2008/0012760 A1* | 1/2008 | Derrick et al. ........... | 342/357.07 |

(Continued)

*Primary Examiner* — Lester Kincaid
*Assistant Examiner* — Daniel G Bassett

(57) ABSTRACT

A mobile device determines that a communications tower is unresponsive to non-emergency wireless signals, and receives user input to select a recipient for an emergency message from a group of pre-registered recipients. The mobile device presents a group of pre-configured status indicators and receives user input to select a particular status indicator. The mobile device generates a text-based emergency message based on the selected recipient, the selected status indicator, location information for the mobile device, and a time stamp. The mobile device sends, to a message server that is different than the message recipient, the text-based emergency message. To determine a status of the message originator without requiring a connection between mobile devices, the intended recipient initiates a fetch message request to retrieve the text-based emergency message from the message server.

20 Claims, 12 Drawing Sheets

(56) References Cited

U.S. PATENT DOCUMENTS

2011/0021154 A1\* 1/2011 Marinier et al. .......... 455/67.11
2014/0173710 A1\* 6/2014 Meng et al. ..................... 726/7

\* cited by examiner

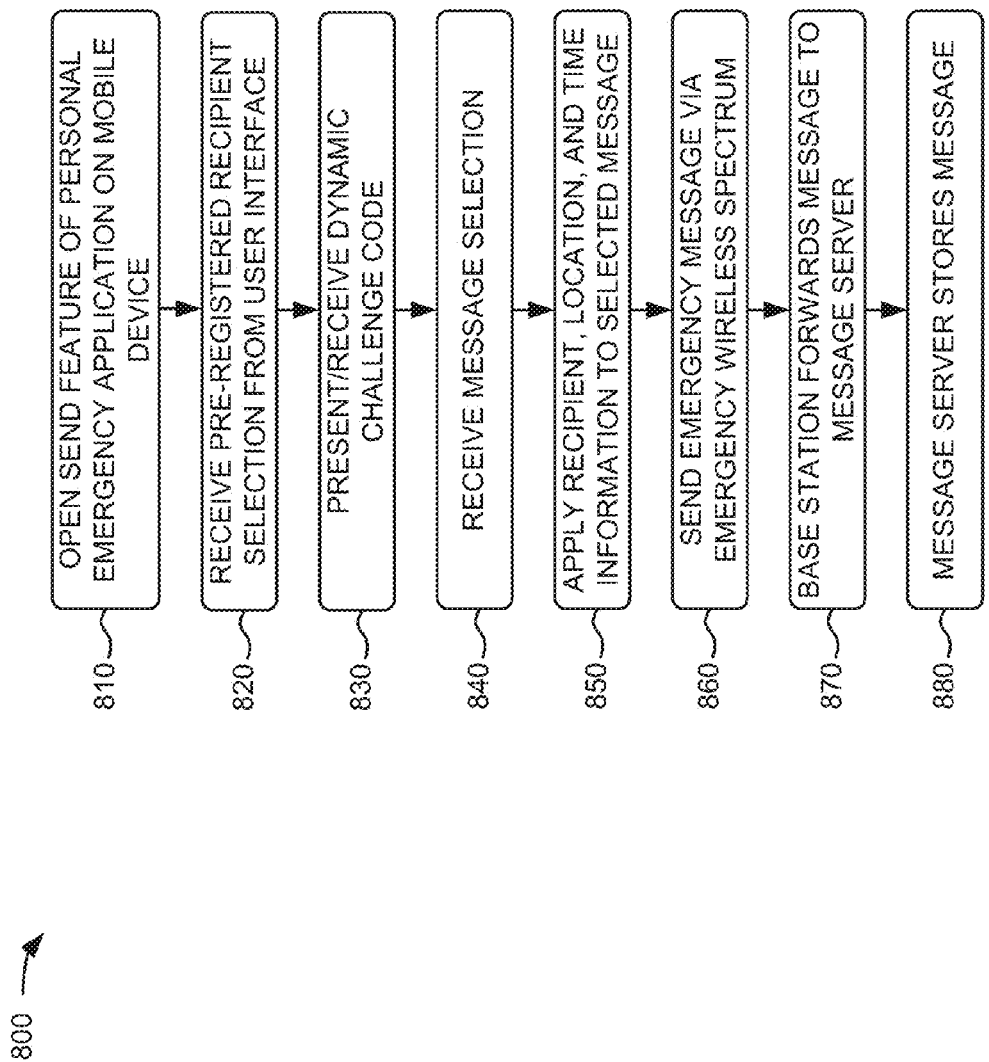

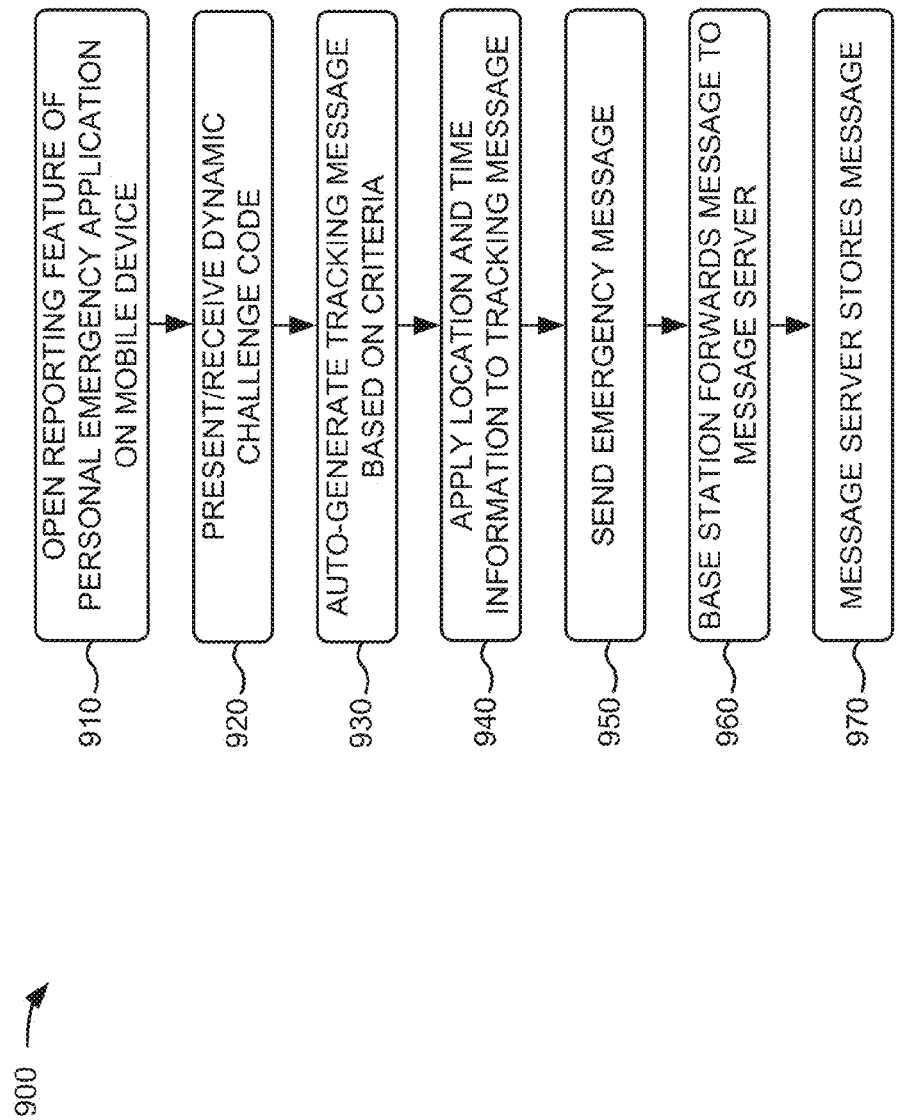

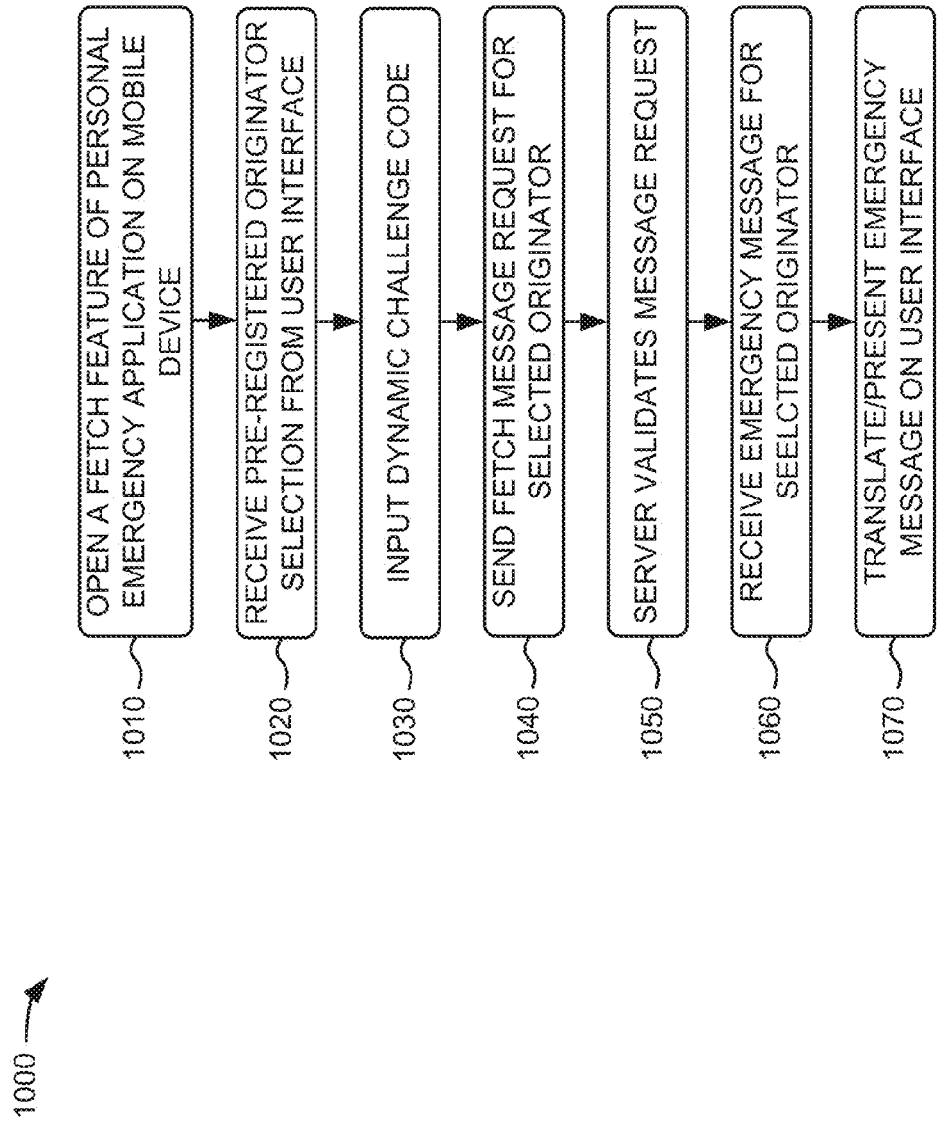

PERSONAL EMERGENCY MESSAGE FRAMEWORK

BACKGROUND

Mobile devices are a primary mode of communication during incidents/emergencies. During localized emergencies, a small number of communication towers may be flooded with calls to/from the local area as people seek to contact loved ones, etc. The local communication tower may become overloaded and/or be shut down by security agencies.

BRIEF DESCRIPTION OF THE DRAWINGS

FIG. 8 is a flow diagram of an exemplary process for sending a personal emergency message from a mobile device;

FIG. 9 is a flow diagram of an exemplary process for sending a personal location status from a mobile device;

FIG. 10 is a flow diagram of an exemplary process for retrieving a personal emergency message from a message server; and FIGS. 11A-12B are exemplary user interfaces for the mobile device of FIG. 2, according to an implementation described herein.

DETAILED DESCRIPTION OF PREFERRED EMBODIMENTS

The following detailed description refers to the accompanying drawings. The same reference numbers in different drawings may identify the same or similar elements.

Figure 1:
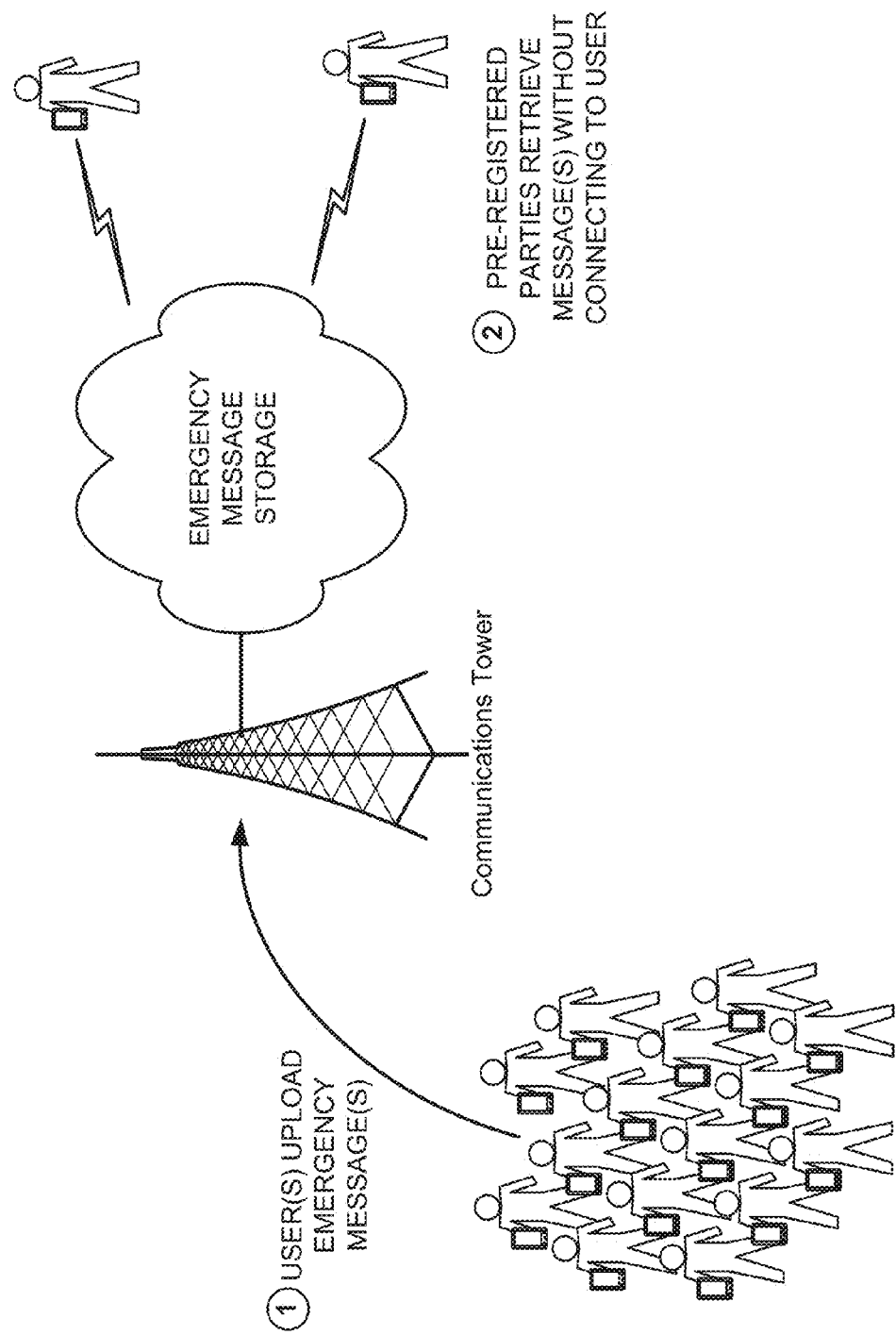
FIG. 1 is a diagram illustrating a concept described herein.

Systems and methods described herein may enable mobile device users to send location/status information (e.g., during emergency conditions) to a remote location that can be accessed by pre-registered users of a service. FIG. 1 is a diagram illustrating a concept described herein.

As shown in FIG. 1, during an emergency situation a large number of mobile device users may simultaneously attempt to send/receive calls from the same general location. One or more communications towers that service the location may reach capacity or be shut down for non-emergency use. For example, in the event of a terrorist attack, the communications tower may become unavailable because everyone is using it and it reaches to its highest capacity or service could be shutdown to prevent a further terrorist attack. However, the communications tower may be accessible using a dedicated emergency channel or dedicated wireless spectrum for emergencies.

According to implementations described herein, an emergency message service is provided in which mobile device users may activate an application (referred to herein as a "personal emergency application," or alternatively as a "personal 911 application" or a "p911 application") to send a status indication over the emergency channel. For example, as indicated in notation 1 of FIG. 1, users (e.g., message originators) at an emergency location may use the p911 application to upload text-based messages to the communications tower. Each text-based message may provide, for example, one of several pre-configured status indications (e.g., "OK," "Danger," etc.) and a location indication (e.g., GPS coordinates, etc.) for the originator. In one implementation, the text-based message may be limited to a set character length (e.g., 160 characters or less) to maximize use of available emergency bandwidth among multiple users. Additionally, the text-based messages may be directed from a user device for retrieval only by pre-registered recipients for the personal emergency message service.

Emergency messages received by the communications tower may be forwarded to an emergency message storage location in the communication network. As indicated in notation 2 of FIG. 1, other pre-registered mobile device users (e.g., message recipients) may initiate communications to retrieve stored messages from the emergency message storage location. Thus, a message recipient may determine a status of the message originator without having a connection between mobile devices. In one implementation, access to emergency messages may be restricted to pre-registered recipients and/or pre-registered devices using a p911 application, such that only certain recipients can have access to messages from a particular originator. In another implementation, stored emergency messages may also be accessible to authorized emergency personnel. According to an implementation described herein, the p911 application may also include challenge codes to prevent automated use of the p911 application (e.g., via malicious "bots") and/or to prevent terrorists from using the p911 application to launch an attack.

Figure 2:
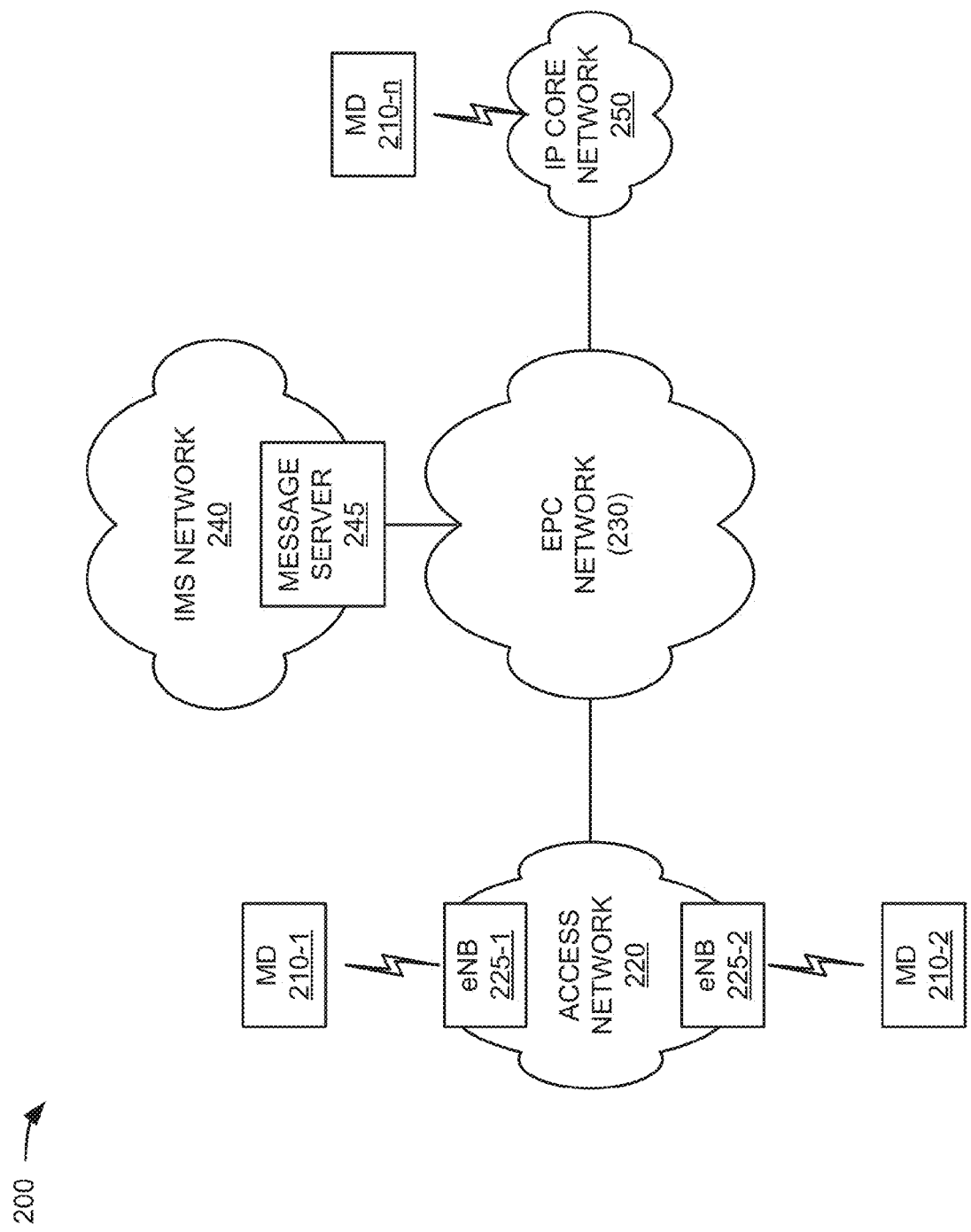
FIG. 2 is a diagram illustrating an exemplary network in which systems and/or methods described herein may be implemented.

FIG. 2 illustrates an exemplary network 200 in which systems and/or methods described herein may be implemented. As illustrated, network 200 may include mobile devices (MD) 210-1 through 210-n (referred to herein collectively as "mobile devices 210" and generically as "mobile device 210"), an access network 220, an evolved packet core (EPC) network 230, an IP multimedia subsystem (IMS) network 240, and an IP core network 250. Access network 220 may include eNodeBs (eNB) 225-1 and 225-2 (referred to herein collectively as "eNBs 225" and generically as "eNB 225"). IMS network 240 may include message server 245. Devices and/or networks of network 200 may interconnect via wired and/or wireless links. According to other implementations, different types of networks may be used.

Mobile device 210 may include a mobile phone, a smart phone, a tablet computer, a laptop computer, a personal digital assistant (PDA), or another type of portable communication device. As another example, mobile device 210 may include a desktop computer, a telephone device with video capability, and/or another type of computation or communication device (e.g., a vehicular communication system). In an exemplary implementation, mobile device 210 may include a device that is capable of communicating over access network 220, EPC network 230, IMS network 240, and/or IP core network 250. Mobile device 210 may also be capable of communicating via a local wireless network (not shown). In exemplary implementations described herein, mobile device 210 may include a personal 911 application that provides a user interface to configure, send, and retrieve emergency messages via an emergency message service.

Access network 220 may include a wireless communications network that connects subscribers (e.g., mobile device 210) to a service provider (e.g., EPC network 230). In one example, access network 220 may include a long-term evolution (LTE) network. In other implementations, access network 220 may employ other wireless network standards such as 3rd Generation Partnership Project (3GPP) 3G/4G standards, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or future wireless access network standards. Terminology used herein may refer to particular network standards, such as LTE, for simplicity, but is not intended as a limitation to any particular wireless standard.

eNB 225 may include one or more computation and/or communication devices that operate according to the LTE or another wireless communications standard. eNB 225 may receive voice and/or data from EPC network 230 and wirelessly transmit that voice and/or data to mobile device 210. eNB 225 may also include one or more devices that wirelessly receive voice and/or data from mobile device 210 and transmit that voice and/or data to EPC network 230 or to other mobile devices 210. In one aspect, eNB 225 may combine the functionalities of a base station and a radio network controller (RNC) provided in 2G or 3G radio access networks.

EPC network 230 may include core network architecture of the 3rd Generation Partnership Project (3GPP) LTE wireless communication standard. For example, EPC network 230 may include a mobility management entity (MME), a serving gateway (SGW), and a packet data network (PDN) gateway (PGW). In one example, EPC network 230 may include an all-IP packet-switched core network that supports high-speed wireless and wireline broadband access technologies. In another example, EPC network 230 may provide packet-switched voice services (e.g., which are traditionally circuit-switched) using IMS network 240.

IMS network 240 may include an architectural framework or network (e.g., a telecommunications network) for delivering IP multimedia services. For example, IMS network 240 may include a home subscriber server (HSS) and a policy and charging rules function (PCRF) (not illustrated). In one implementation, the HSS may interface with mobile device 210, EPC network 230, and/or message server 245 and may provide information to message server 245 that enables message server 245 to communicate with mobile device 210 using IP-based communication protocols. The PCRF may perform operations that enforce network policies associated with a communication session with mobile device 210.

Message server 245 may include one or more server devices, network devices, or other types of computational or communicative devices that gather, process, search, and/or provide information in a manner described herein. In one exemplary implementation, message server 245 may receive emergency messages from mobile devices 210, may store emergency messages, and may provide access to stored messages by other validated devices. Message server 245 may be a distributed component. For example, although shown in FIG. 2 within IMS network 240, in other implementations some or all features of message server 245 may be included in EPC network 230 and/or IP core network 250.

IP core network 250 may include one or more networks (e.g., a local area network (LAN), a wide area network (WAN), a metropolitan area network (MAN), the Internet, etc.) capable of communicating with mobile device 210 and operating according to the Internet Protocol.

In FIG. 2, the particular arrangement and number of components of network 200 are illustrated for simplicity. In practice there may be more mobile devices 210, access networks 220, EPC networks 230, IMS networks 240, application servers 245, and/or IP core networks 250. For example, there may be thousands of mobile devices 210 and/or eNBs 225.

Figure 3:
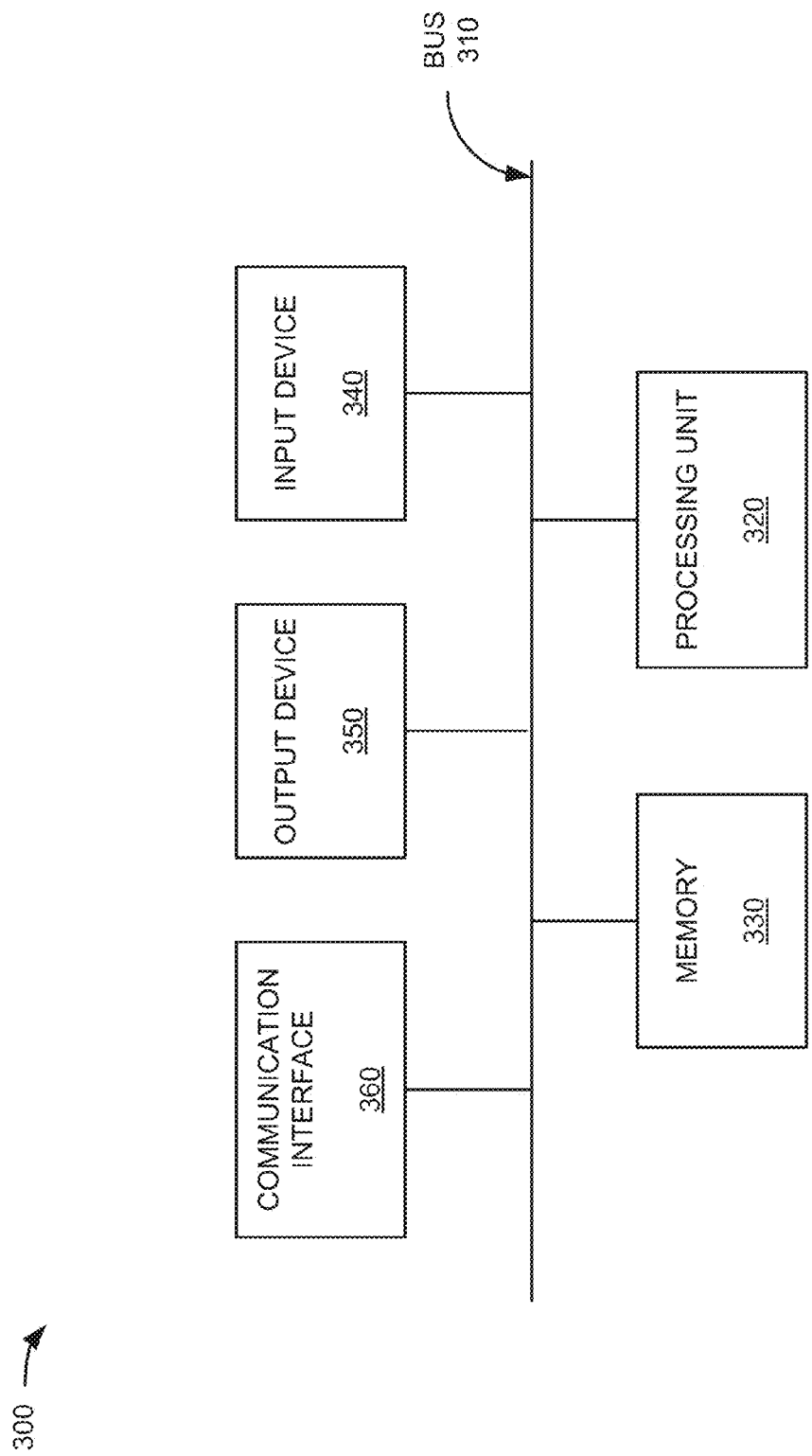
FIG. 3 is a block diagram illustrating exemplary components of a device that may correspond to one or more of the devices of FIG. 2.

FIG. 3 is a diagram of exemplary components of a device 300. Each of mobile device 210 or messaging server 245 may be implemented/installed as a combination of hardware and software on one or more devices 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 100.

As described herein, device 300 may perform certain operations in response to processing unit 320 executing software instructions contained in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
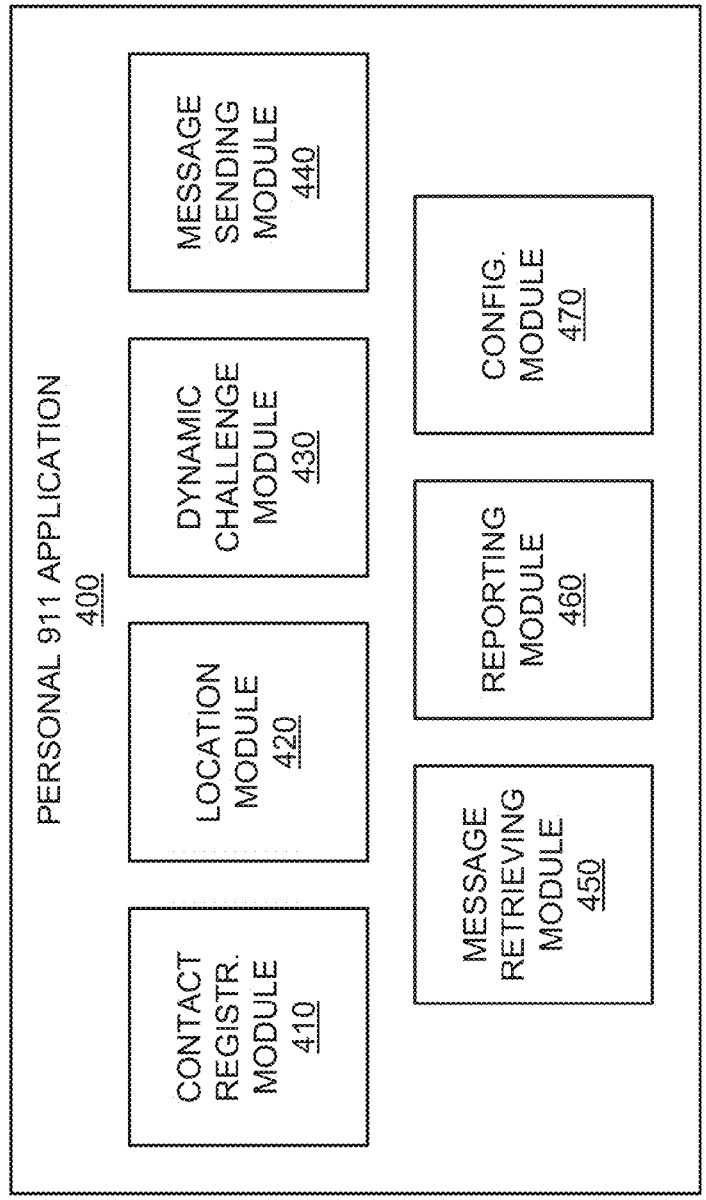
FIG. 4 is a block diagram illustrating exemplary functional components of a mobile device of FIG. 2.

FIG. 4 is a block diagram of exemplary functional components of mobile device 210. In one implementation, the functions described in connection with FIG. 4 may be performed by one or more components of device 300 (FIG. 3). As shown in FIG. 4, mobile device 210 may include a personal 911 application 400 that has a contact registration module 410, a location module 420, a dynamic challenge code module 430, a message sending module 440, a message retrieving module 450, a reporting module 460, and a configuration module 470.

Personal 911 application 400 may be stored in memory (e.g., memory 330) of mobile device 210 for access by a user. In one implementation, personal 911 application 400 may be provided as part of new equipment from a service provider or original equipment manufacturer. In another implementation, personal 911 application 400 may be downloaded or otherwise transferred to mobile device 210. Some aspects of personal 911 application 400 may be run as a background application or daemon, while other aspects of personal 911 application 400 may provide an active user interface.

Contact registration module 410 may establish trust relationships between mobile device 210 and other mobile devices/users. Particularly, as part of a contact registration process, contact registration module 410 may solicit device information for trusted contacts and associate a unique identifier (e.g., a MAC address or another unique mobile identifier) with the trusted contact. Similarly, contact registration module 410 may provide a unique identifier of mobile device 210 to personal 911 applications 400 residing on other mobile devices. In one implementation, information to establish trust relationships may be exchanged via a peer-to-peer communication. In another aspect, a network device (e.g., message server 245 or another device) may communicate with mobile devices 210 to facilitate an exchange of unique identifiers. In still another aspect, mobile device 210 may solicit direct user input for entry of a unique identifier for a trusted contact device.

Location module 420 may determine a geographic position of mobile device 210 to include in emergency messages. For example, location module 420 may include location-determining logic that may communicate with GPS (global positioning system) satellites, cellular towers used in cell-tower triangulation, or Wi-Fi (IEEE 802.11x) routers used in location-enabled Wi-Fi services. In one implementation, location module 420 may apply comparisons of location data over a time interval to determine if mobile device 210 is moving and/or a direction of movement. Location module 420 may provide location data (e.g., in text-based form) to message sending module 440 for inclusion in outgoing emergency messages.

Dynamic challenge module 430 may generate a challenge-response test to determine use by a human operator. For example, dynamic challenge module 430 may generate a set of characters that are generally not recognizable by a computer, but are able to be interpreted by a human. Dynamic challenge module 430 may provide a user interface to present a challenge code and receive text input that repeats the code characters. In one aspect, dynamic challenge module 430 may be used as a sub-process by either of message sending module 440 or message retrieving module 450 to provide security and eliminate misuse from automated processes.

Figure 11B:
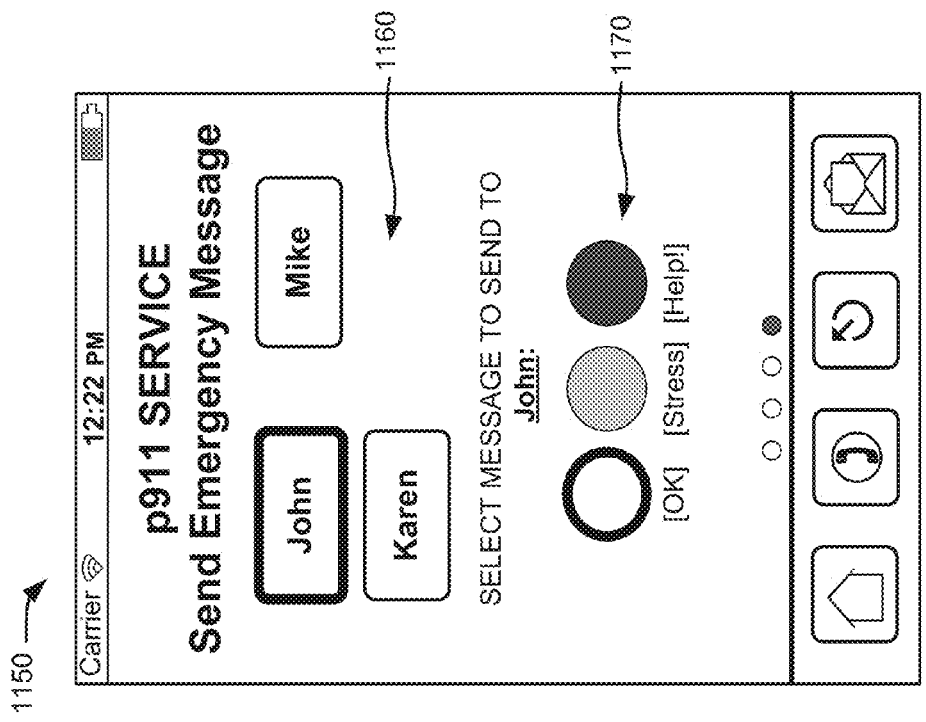
Figure 11A:
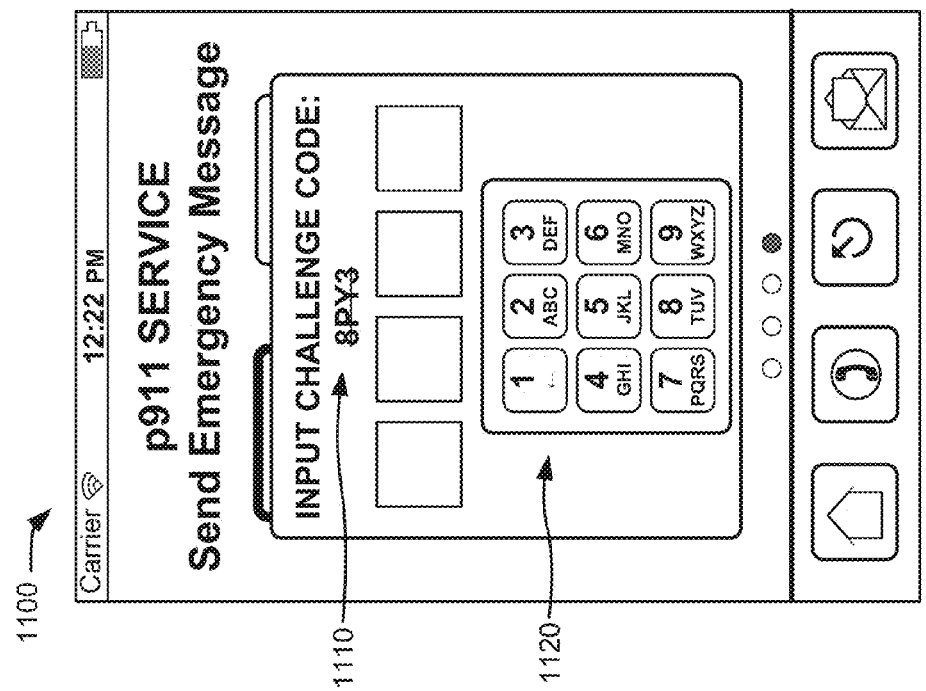

FIG. 11A provides an exemplary user interface 1100 that may be generated by dynamic challenge module 430. As shown in FIG. 11A, a challenge code 1110 may be presented to a user, along with an input mechanism 1120 to enable the user to enter the challenge code. In one implementation, as shown in FIG. 11A, input mechanism 1120 may include a virtual keypad. In another implementation, input mechanism 1120 may include a physical keypad from mobile device 210.

Returning to FIG. 4, message sending module 440 may manage sending of emergency messages. For example, message sending module 440 may retrieve a list of authorized recipients from contact registration module 410 and present the group of authorized recipients of an emergency message to a user. Message sending module 440 may also present a group of previously-configured status selections (e.g., "safe," "OK-coming home," "danger," etc.) that may be used for the emergency message. Message sending module 440 may receive user input to select a particular recipient and a particular message. In one implementation, message sending module 440 may also invoke a challenge from dynamic challenge module 430 before accepting or processing user selections.

After receiving the particular recipient and particular message selections, message module 440 may retrieve location information (e.g., from location module 420) and the originator's unique identifier (e.g., from contact registration module 410). Message sending module 440 may then generate a text-based emergency message that includes the originator's unique identifier, the intended recipient, the selected status, and the location information. In one implementation, the text-based emergency message may be assembled in a particular sequence and/or delimited format, so that certain data fields that can be identified and interpreted by message server 245 and personal 911 applications on other mobile devices 210.

FIG. 11B provides an exemplary user interface 1150 that may be generated by message sending module 440. As shown in FIG. 11B, user interface 1150 may include a recipient selection section 1160, from which a user may select a recipient of an emergency message (e.g., "John"). Each of the indicated possible recipients in section 1160 may be retrieved, for example, from a list of authorized recipients (e.g., from contact registration module 410). User interface 1150 may also include a message selection section 1170, from which a user may select from a group of status indicators (e.g., "OK," "Stress," "Help!"). In one implementation, indicators for status indicators may be color-coded for easier identification. For example, the indicator for "OK" or similar indications may be green, the indicator for "Stress" or similar indications may be yellow, and the indicator for "Help!" or similar indications may be red. User input to select a status indicator may cause message sending module 440 to generate and send a text-based emergency message that includes the selected indicator. In one implementation, the user may be able to author a status indicator. The status indicator may be limited in the number of characters.

Returning to FIG. 4, message sending module 440 may direct the text-based emergency message to message server 245. In one implementation, personal 911 application 400 may determine that normal (e.g., non-emergency) wireless communications (e.g., between mobile device 210 and eNB 225) are not functioning before allowing message sending module 440 to send messages via dedicated emergency services spectrum. For example, in one implementation, personal 911 application 400 may provide a ping to test the non-emergency frequencies or mobile device 210 may detect a timed out request using another (e.g., non-emergency) wireless spectrum. In another implementation, personal 911 application 400 may receive a notification, such as a wireless emergency alert system message using dedicated emergency channels, to indicate a localized emergency. For example, message server 245 or another device in one of networks 220, 230, or 240 may push a message to mobile devices 210 in an affected area to let users know of a service disruption and/or to activate personal 911 application 400.

Message retrieving module 450 may manage retrieval of emergency messages. For example, message retrieving module 450 may present a user interface with a list of authorized originators (e.g., users of other mobile devices 210 with which personal 911 application 400 have a trusted relationship). Message retrieving module 450 may receive user input to select a particular originator. In one implementation, message retrieving module 450 may invoke a challenge from dynamic challenge module 430 before accepting or processing user selections.

Figures 12A, 12B:
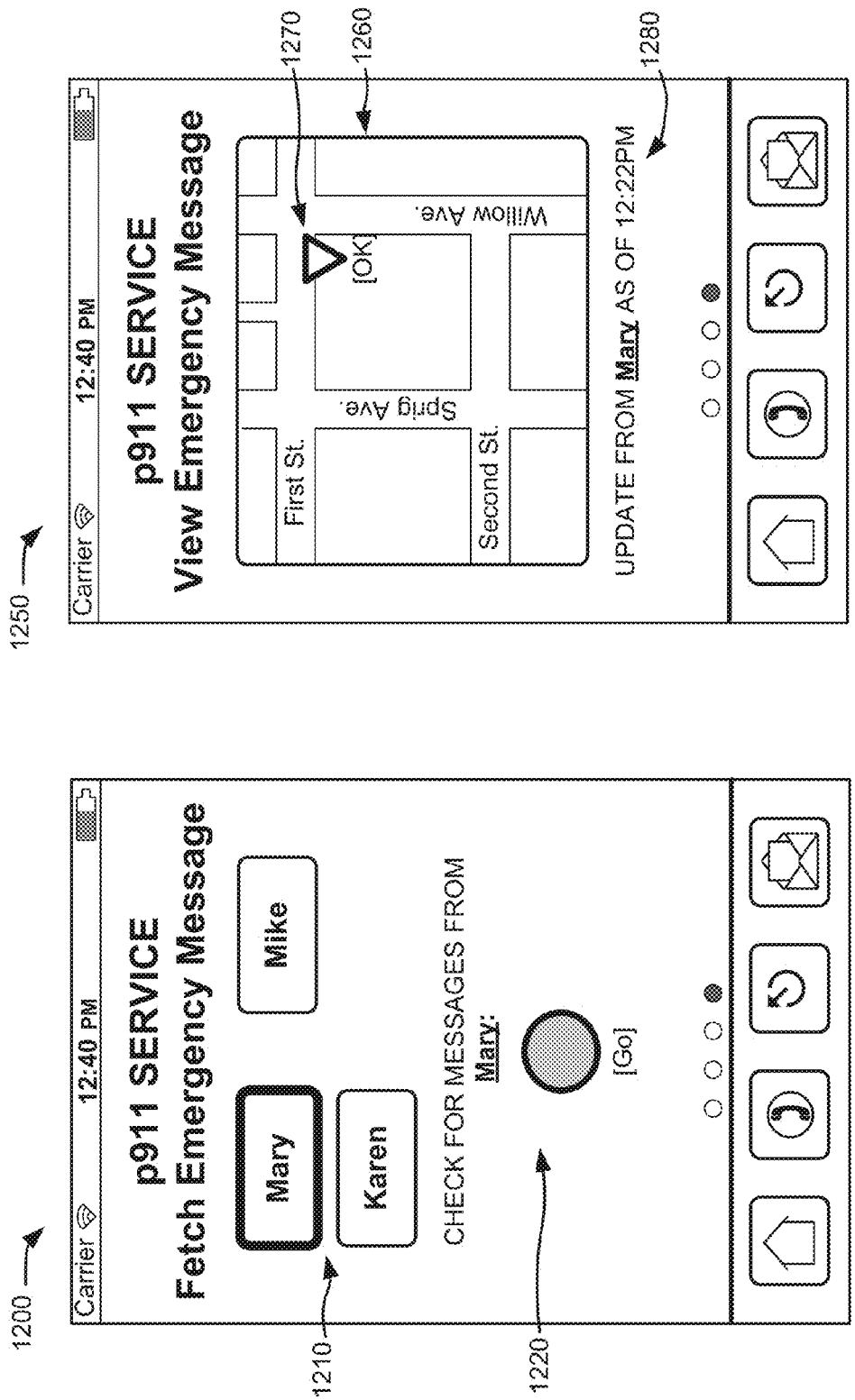

FIG. 12A provides an exemplary user interface 1200 that may be generated by message retrieving module 450. As shown in FIG. 12A, user interface 1200 may include an originator selection section 1210, from which a user may select an originator of an emergency message (e.g., "Mary"). Each of the indicated possible originator section 1210 may be retrieved, for example, from a list of authorized originators (e.g., from contact registration module 410). In one implementation, user interface 1200 may also include a confirmation section 1220 to solicit user confirmation to fetch an emergency message (e.g., "Go"). User confirmation may cause message retrieving module 450 to generate and send a request to retrieve an emergency message from the selected originator.

Returning to FIG. 4, message retrieving module 450 may receive a text-based emergency message (e.g., from message server 245) in response to a request. Message retrieving module 450 may translate the text-based information into a graphical presentation for the user of mobile device 210. For example, message retrieving module 450 may identify location information to determine a relevant area to present as a map. Message retrieving module 450 may select a color-coded indicator, based on the message status, to present on the map in the approximate location indicated by the text-based emergency message. In one implementation, the color-coded indicator may represent the location of the originator and the message status (e.g., "OK"). Additionally, message retrieving module 450 may present a relevant time (e.g., the time the text-based emergency message was sent).

FIG. 12B provides an exemplary user interface 1250 that may be generated by message retrieving module 450 to present a retrieved emergency message. A map section 1260 may be presented that reflects the area surrounding the location indicated in the text-based emergency message. In one implementation, the mapped area may be scaled (zoomed in/out) based on user input. An indicator 1270 may be overlaid on map section 1260 to indicate the location of the originator. In one implementation, the indicator may be color coded to represent the status of the originator (e.g., based on the text-based emergency message) or the identity of the originator. In another implementation, the indicator may flash or change color to represent that the originator is moving (based on location information in the text-based emergency message). In one aspect, user interface 1250 may also include a text section to present additional (or duplicative) information from the text-based emergency message, such as the originator, the message time-stamp, the status (e.g., "OK"), etc.

Returning to FIG. 4, reporting module 460 may generate automatic location updates for a user (e.g., originator) of personal 911 application 400. For example, when initiated by a user, reporting module 460 generates location updates (based on information from location module 420) and send the status updates to message server 245. In one implementation, reporting module 460 may require user input of a challenge code (e.g., from dynamic challenge module 430) to activate a reporting mode. Reporting module 460 may send location updates at regular intervals (e.g., every 5 minutes) or based on a monitored condition (e.g., battery life). The location updates may include, for example, location and time information associated with mobile device 210.

In one implementation, reporting module 460 may include a reason (e.g., in contrast with an originator-selected status) with each location update. Reporting module 460 may provide location updates via dedicated emergency spectrum or non-emergency spectrum. Reasons may include, for example, "update" for a typical interval report or "battery" to indicate low battery of mobile device 210. In one implementation, location updates from reporting module 460 may not be associated with a particular recipient, but may be stored by message server 245 for retrieval, for example, by authorized persons (e.g., emergency response personnel). In another aspect reporting module 460 may provide a user with occasional reminders that reporting module 460 is actively reporting location updates.

Configuration module 470 may provide a user interface to change settings and/or options available in other modules 410-460. For example, in one implementation, one or more customized status messages may be added to message sending module 440. For example, a user may use configuration module 470 to add a customized status (e.g., "no wheelchair," "capsized," etc.) that may be relevant to a user for a particular time or type of activity. In one aspect, the colors associated with custom and/or standard status indications may also be customizable. In another implementation, configuration module 470 may also enable location update settings for reporting module 460 (e.g., update intervals, adding a recipient, etc.) to be customized.

Although FIG. 4 shows exemplary functional components of mobile device 210, in other implementations, mobile device 210 may include fewer, different, or additional functional components than those depicted in FIG. 4.

Figure 5:
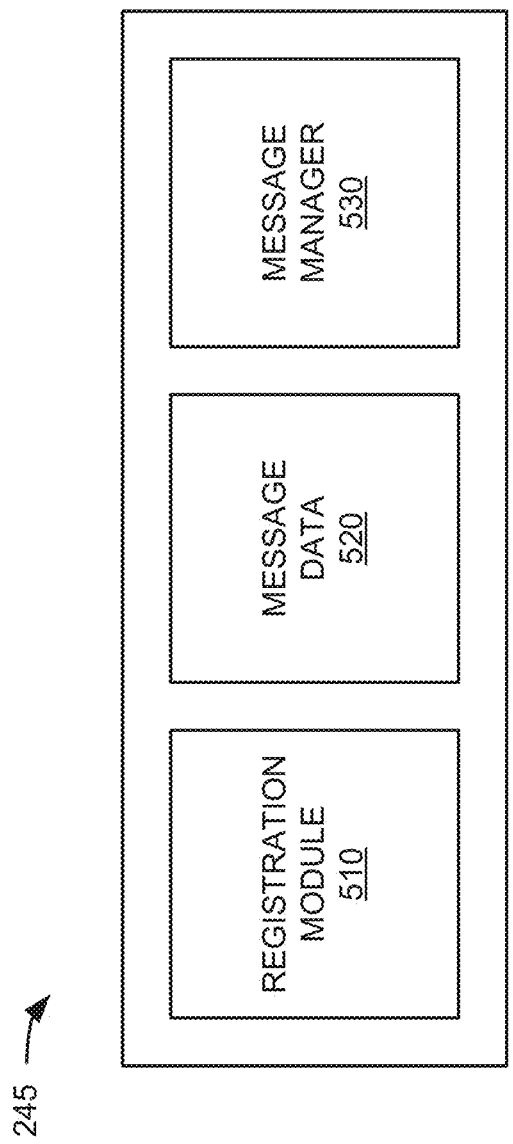
FIG. 5 is a block diagram illustrating exemplary functional components of a message server of FIG. 2.

FIG. 5 is a block diagram of exemplary functional components of message server 245. In one implementation, the functions described in connection with FIG. 5 may be performed by one or more components of device 300 (FIG. 3). As shown in FIG. 5, message server 245 may include a registration module 510, message data 520, and a message manager 530.

Registration module 510 may communicate with mobile devices 210 to facilitate an exchange of unique identifiers between different personal 911 applications. In one implementation, registration module 510 may also register individual mobile devices and/or personal 911 applications for access to a personal emergency message service.

Message data 520 may store text-based emergency messages generated by personal 911 applications. In one implementation, messages stored in message data 520 may be associated with a particular originator. In another implementation, messages stored in message data 520 may be stored in a tabular format using a delimited structure of the text-based emergency message to identify particular fields (e.g., an originator field, a recipient field, a status field, a location field, a time-stamp field, etc.). In still another implementation, message data 520 may include additional fields to track, for example, when and/or to what devices messages were delivered.

Message manager 530 may receive new text-based emergency messages generated by personal 911 application 400, and may direct the new messages to message data 520 for storage. In some implementations, message manager 530 may validate the originating mobile device 210 prior to accepting new messages. Message manager 530 may receive requests (e.g., from message retrieving module 450) to retrieve emergency messages (e.g., associated with a particular originator and directed to a particular recipient). Message manager 530 may validate the requests and forward the request messages from message data 520 to the validated requesting mobile device 210. In another implementation, message manager 530 may identify a recipient of a new emergency message and may provide a notification (e.g., a push notification to the recipients mobile device) that a new emergency message is available for retrieval.

Although FIG. 5 shows exemplary functional components of message server 245, in other implementations, message server 245 may include fewer, different, or additional functional components than those depicted in FIG. 5.

Figure 6:
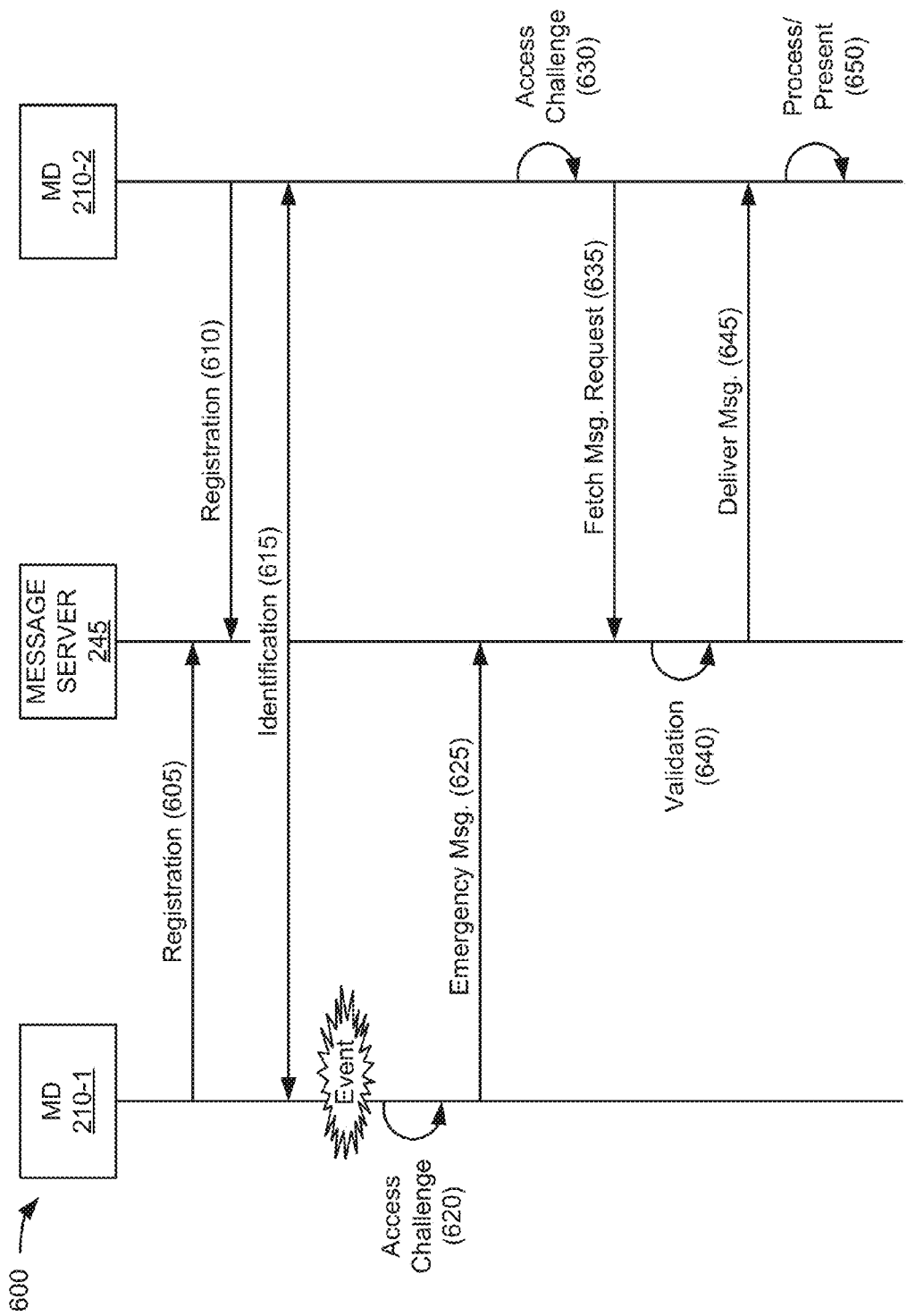
FIG. 6 a diagram of exemplary communications among a portion of the network of FIG. 2.

FIG. 6 is a diagram of exemplary communications for a portion 600 of network 200. Communications in FIG. 6 may represent communications to deliver an emergency message between mobile devices using personal 911 applications. As shown in FIG. 6, network portion 600 may include mobile device 210-1, message server 245, and mobile device 210-2. Mobile device 210-1, message server 245, and mobile device 210-2 may include functionality described above in connection with, for example, FIGS. 1-5.

As shown in FIG. 6, mobile device 210-1 may register 605 with message server 245 to activate a personal 911 application 400 on mobile device 210-1. Registration information may include, for example, a user name, a device identifier, a license agreement, a legal release, etc. associated with personal 911 application 400. Mobile device 210-2 may perform a similar registration 610.

Mobile devices 210-1 and 210-2 may identify each other (as indicated by reference number 615). For example, prior to an emergency situation, users of mobile devices 210-1 and 210-2 may configure personal 911 applications 400 on their respective devices. In one implementation, a user of mobile device 210-1 may identify mobile device 210-2, for example, via a mobile directory number (MDN) or another indicator. Mobile devices 210-1 and 210-2 may exchange MAC addresses and/or other unique identifiers and store the MAC addresses in a local memory (e.g., accessible by the respective personal 911 applications 400). In another implementation, personal 911 applications 400 on mobile devices 210-1 and 210-2 may communicate via an IP session to automatically exchange identification information.

After registrations 605/610 and identification 615 have occurred, an event (e.g., a localized emergency event) may occur that affects access to local cell towers near mobile device 210-1. The mobile device user may select an option on personal 911 application 400 to send an emergency message. Personal 911 application 400 (e.g., dynamic challenge module 430) on mobile device 210-1 may generate an access challenge code and receive user input to enable the message sending option, as indicated by reference number 620. For example, personal 911 application 400 may present user interface 1100 (FIG. 11A) to solicit user input for a challenge code. In one implementation, personal 911 application 400 may also detect that regular service to local communications towers (e.g., eNB 225-1) is not available prior to enabling the message sending option.

Assuming the challenge code is provided, the user may select a recipient and message to send. For example, personal 911 application 400 (e.g., message sending module 440) on mobile device 210-1 may present user interface 1150 (FIG. 11B) to solicit a particular recipient and message type. Based on the user input, personal 911 application 400 on mobile device 210-1 may send emergency message 625 to message server 245 using dedicated emergency spectrum for the local communications tower. Emergency message 625 may include, for example, an originator identifier, the selected message, originator location information, a time stamp, and a recipient identifier. Message server 245 may receive emergency message 625 and store emergency message 625 for retrieval by the identified recipient.

A user of mobile device 210-2 (e.g., the intended recipient of emergency message 625) may subsequently recognize that regular communications to/from mobile device 210-1 are disabled. The mobile device user may select an option on personal 911 application 400 to retrieve an emergency message. Personal 911 application 400 on mobile device 210-2 may generate an access challenge and receive user input to enable the message sending option, as indicated by reference number 630. For example, personal 911 application 400 may present user interface similar to user interface 1100 (FIG. 11A).

Assuming the challenge code is provided, the user of mobile device 210-2 may select a message originator (e.g., from which an emergency message may be available). For example, personal 911 application 400 on mobile device 210-2 may present user interface 1100 (FIG. 12A) to solicit a particular message originator. Based on the user input, personal 911 application 400 on mobile device 210-2 may send a fetch message request 635 to message server 245. In one implementation, fetch message request 635 may be provided using conventional communication paths (e.g., using a text message, session-based communications, etc.). In another implementation, fetch message request 635 may be provided using dedicated emergency spectrum for a local communications tower, when regular service to local communications towers (e.g., eNB 225-2) is not available.

Fetch message request 635 may include, for example, the recipient identifier and the originator's identifier. Message server 245 may receive fetch message request 635 and perform a validation check 640 to verify that mobile device 210-2 is authorized to receive emergency message 625. For example, message server 245 may compare the recipient identifier in fetch message request 635 with the recipient identifier in stored emergency message 625. Assuming fetch message request 635 is validated, message server 245 may provide delivered message 645 to mobile device 210-2. In one implementation, delivered message 645 may include the same text-based information and format of emergency message 625.

Personal 911 application 400 on mobile device 210-2 may receive delivered message 645 and may process and present 650 the information from delivered message 645 to the user. For example, personal 911 application 400 on mobile device 210-2 may apply the location information, the status message, the originator identifier, and the time stamp to present user interface 1250 (FIG. 12B).

Although FIG. 6 shows exemplary components of network portion 600, in other implementations, network portion 600 may include fewer components, and/or additional components than depicted in FIG. 6. Alternatively, or additionally, one or more components of network portion 600 may perform one or more other tasks described as being performed by one or more other components of network portion 600. For example, in an alternate implementation, message server 245 may process emergency message 625 to provide user interface information to mobile device 210-2. Thus, rather than providing a text-based communication to mobile device 210-2, message server 245 may perform some of the message processing functions described above in relation to mobile device 210-2 to provide a graphical user interface.

Figure 7:
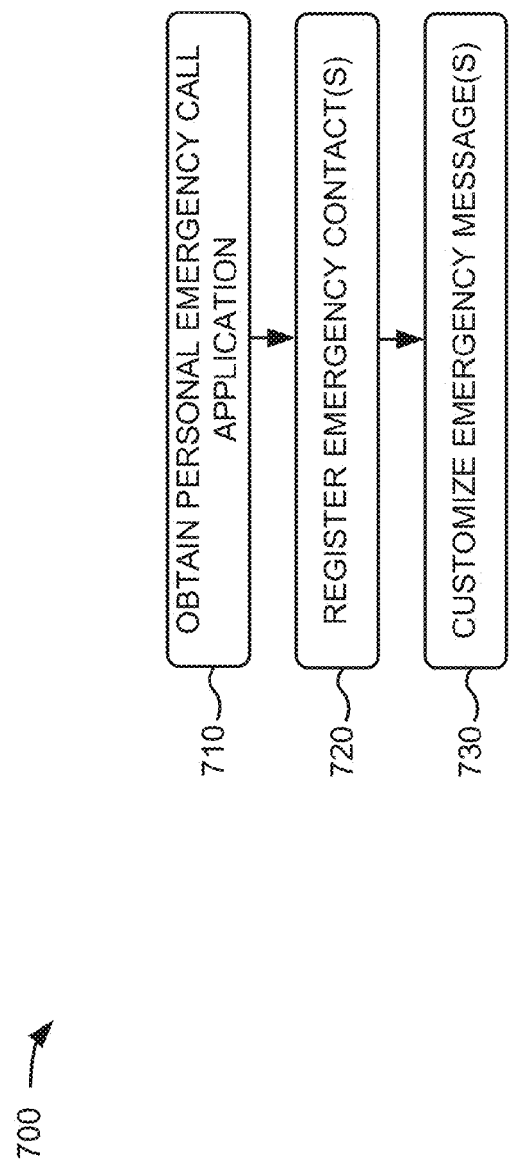
FIG. 7 is a flow diagram of an exemplary process for configuring a personal emergency application on a mobile device.

FIG. 7 is a flow diagram of an exemplary process 700 for configuring a personal emergency call application on a mobile device according to an implementation described herein. In one implementation, process 700 may be performed by mobile device 210. In another implementation, some or all of process 700 may be performed by another device or group of devices, including or mobile device 210. For example, in one implementation, message server 245 may perform one or more parts of process 700.

As shown in FIG. 7, process 700 may include obtaining a personal emergency call application (block 710), registering one or more emergency contacts (block 720). For example, as described in connection with FIG. 4, personal 911 application 400 may be provided as part of new equipment from a service provider or original equipment manufacturer. In another implementation, personal 911 application 400 may be downloaded or otherwise transferred to mobile device 210. Contact registration module 410 may solicit device information for trusted contacts and associate a unique identifier (e.g., a MAC address or another unique mobile identifier) with the trusted contact.

Process 700 may also include customizing one or more emergency messages (block 730). For example, using configuration module 470, one or more customized status messages may be added to message sending module 440.

FIG. 8 is a flow diagram of an exemplary process 800 for sending a personal emergency message from a mobile device according to an implementation described herein. In one implementation, process 800 may be performed by mobile device 210. In another implementation, some or all of process 800 may be performed by another device or group of devices, including mobile device 210. For example, in one implementation, message server 245 may perform one or more parts of process 800.

As shown in FIG. 8, process 800 may include opening a send feature of a personal emergency application on a mobile device (block 810), and receiving a pre-registered recipient selection from a user interface of the personal emergency application (block 820). For example, as described above in connections with FIGS. 4 and 6, a mobile device user may select an option on personal 911 application 400 to send an emergency message. The user may select an intended recipient. For example, personal 911 application 400 (e.g., message sending module 440) on mobile device 210-1 may present user interface 1150 (FIG. 11B) to solicit a particular recipient.

Process 800 may also include presenting and receiving a dynamic challenge code (block 830). For example, as described above in connections with FIGS. 4 and 6, personal 911 application 400 (e.g., dynamic challenge module 430) on mobile device 210-1 may generate an access challenge code and receive user input to enable the message sending option, as indicated by reference number 620. For example, personal 911 application 400 may present user interface 1100 (FIG. 11A) to solicit user input for a challenge code.

Process 800 may further include receiving a message selection (block 840) and applying recipient, location, and time information to the selected message (block 850). For example, as described above in connections with FIGS. 4 and 6, the user may select from user interface 1150 (FIG. 11B) a particular message type for the intended recipient. Based on the user input, personal 911 application 400 (e.g., message sending module 440) on mobile device 210-1 may generate an emergency message 625. Emergency message 625 may include, for example, an originator identifier, the selected message, originator location information, a time stamp, and a recipient identifier.

Process 800 may additionally include sending an emergency message via emergency wireless spectrum (block 860), forwarding the emergency message to a message server (block 870), and storing the message (block 880). For example, personal 911 application 400 (e.g., message sending module 440) on mobile device 210-1 may send emergency message 625 to message server 245 using dedicated emergency spectrum for the local communications tower. Message server 245 may receive emergency message 625 and store emergency message 625 for retrieval by the identified recipient.

FIG. 9 is a flow diagram of an exemplary process 900 for sending a personal location status from a mobile device according to another implementation described herein. In one implementation, process 900 may be performed by mobile device 210. In another implementation, some or all of process 900 may be performed by another device or group of devices, including mobile device 210. For example, in one implementation, message server 245 may perform one or more parts of process 900.

As shown in FIG. 9, process 900 may include opening a reporting feature of a personal emergency application on a mobile device (block 910), and presenting and receiving a dynamic challenge code (block 920). For example, a user may select a reporting option from personal 911 application 400. When initiated by a user, reporting module 460 (FIG. 4) may generate location updates (based on information from location module 420) and send the status updates to message server 245. In one implementation, reporting module 460 may require user input of a challenge code (e.g., from dynamic challenge module 430) to activate a reporting mode.

Process 900 may further include automatically generating a tracking message based on pre-stored criteria (block 930) and applying location and time information to the tracking message (block 940). For example, reporting module 460 may send location updates at regular intervals or based on monitored systems. The location updates may include, for example, location and time information associated with mobile device 210.

Process 900 may additionally include sending the tracking message (block 950), forwarding the emergency message to a message server (block 960), and storing the message (block 970). For example, reporting module 460 may provide location updates via dedicated emergency spectrum or non-emergency spectrum. In one implementation, location updates from reporting module 460 may not be associated with a particular recipient, but may be stored by message server 245 for retrieval, for example, by authorized persons (e.g., emergency response personnel).

FIG. 10 is a flow diagram of an exemplary process 1000 for retrieving a personal emergency message from a message server according to an implementation described herein. In one implementation, process 1000 may be performed by mobile device 210. In another implementation, some or all of process 1000 may be performed by another device or group of devices, including mobile device 210. For example, in one implementation, message server 245 may perform one or more parts of process 1000.

As shown in FIG. 10, process 1000 may include opening a fetch feature of a personal emergency application on a mobile device (block 1010), and receiving a pre-registered originator selection from a user interface of the personal emergency application (block 1020). For example, a user may select a retrieve message option from personal 911 application 400. As described above in connections with FIGS. 4 and 6, message retrieving module 450 may present a user interface with a list of authorized originators (e.g., users of other mobile devices 210 with which personal 911 application 400 has a trusted relationship). Message retrieving module 450 may receive user input to select a particular originator.

Process 1000 may also include presenting and receiving a dynamic challenge code (block 1030). For example, message retrieving module 450 may invoke a challenge from dynamic challenge module 430 before accepting or processing user selections.

Process 1000 may further include sending a fetch message request for the selected originator (block 1040). For example, as described above in connections with FIGS. 4 and 6, personal 911 application 400 (e.g., message retrieving module 450) on mobile device 210-2 may send a fetch message request 635 to message server 245. In one implementation, fetch message request 635 may be provided using conventional communication paths (e.g., using a text message, session-based communications, etc.). In another implementation, fetch message request 635 may be provided using dedicated emergency spectrum for a local communications tower.

Process 1000 may additionally include validating the fetch message request (block 1050), receiving an emergency message for the selected originator (block 1060), and translating and presenting the emergency message on a user interface (block 1070). For example, as described above in connections with FIGS. 4 and 6, message server 245 may receive fetch message request 635 and perform a validation check 640 to verify that mobile device 210-2 is authorized to receive emergency message 625. Assuming fetch message request 635 is validated, message server 245 may provide delivered message 645 to mobile device 210-2. Personal 911 application 400 (e.g., message retrieving module 450) on mobile device 210-2 may receive delivered message 645 and may apply the location information, the status message, the originator identifier, and the time stamp to present a graphical user interface, such as user interface 1250 (FIG. 12B).

In an exemplary use case of a personal emergency framework according to an implementation. Assume Mary is a customer of a service provider that provides personal 911 applications 400 on mobile devices 210 and has registered the personal 911 applications 400 on her mobile device 210.

Assume Mary activates the reporting feature of her personal 911 application prior to embarking on a ski trip. Mary's mobile device 210 sends occasional location updates to message server 245 while she skis. Assume a disaster happens, and Mary is buried under snow. An emergency support team (e.g., rescue team, police, etc.) may access message server 245 to identify a last-sent location update from mobile device 210 and focus rescue efforts around that location.

In another scenario, Mary's personal 911 application may not be configured to send occasional updates, but is configured to monitor battery life of mobile device 210. Again, assume the disaster happens. Mary is buried under snow and unable to use her phone. When Mary's personal 911 application detects that the battery life drops below a pre-configured threshold (e.g., ten percent), Mary's mobile device 210 automatically sends a location update to message server 245. The emergency support team may retrieve the location information and direct rescue efforts to the location.

According to another implementation described herein, a mobile device may determine that a communications tower is unresponsive to non-emergency wireless signals, and may receive user input to select a recipient for an emergency message from a group of pre-registered recipients. The mobile device may present a group of pre-configured status indicators and may receive user input to select a particular status indicator. The mobile device may generate a text-based emergency message based on the selected recipient, the selected status indicator, location information for the mobile device, and a time stamp. The mobile device may send, to a message server that is different than the message recipient, the text-based emergency message. The text-based emergency message may be retrieved from the message server, by the recipient, to determine a status of the message originator without requiring a connection between mobile devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 7-10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A mobile device, comprising:
   a memory to store instructions; and
   a processor configured to execute the instructions in the memory to:
      determine that a communications tower is unresponsive to non-emergency wireless signals;
      receive user input to select a recipient from a group of pre-registered recipients for an emergency message;
      present a group of pre-configured status indicators;
      receive user input to select a status indicator from the group of pre-configured status indicators;
      generate a text-based emergency message based on the selected recipient, the selected status indicator, location information for the mobile device, and a time stamp;
      send, after the determining and to a message server that is different than the message recipient, the text-based emergency message, wherein the text-based emergency message is sent using a dedicated emergency wireless spectrum for the communications tower;
      receive user input to select an originator from a group of pre-registered originators of emergency messages;
      send, to the message server that is different than the originator, a fetch message request to obtain, from the message server, a different text-based emergency message associated with the originator;
      receive, from the message server, the different text-based emergency message; and
      present, to a user of the mobile device, a graphical representation of information included in the different text-based emergency message.

2. The mobile device of claim 1, wherein the processor is further configured to execute instructions in the memory to:
   present a dynamic challenge code that requires a user response before sending the text-based emergency message; and
   receive the user response to the dynamic challenge code.

3. The mobile device of claim 2, wherein the dynamic challenge code includes a dynamic challenge and response interface to determine use by a human operator.

4. The mobile device of claim 1, wherein the location information comprises a location of the mobile device when the text-based emergency message is generated and an indication of whether the mobile device is moving.

5. The mobile device of claim 1, wherein the processor is further configured to execute instructions in the memory to:
   store a personal emergency application that enables the sending the text-based emergency message using the dedicated emergency wireless spectrum.

6. The mobile device of claim 5, wherein the processor is further configured to execute instructions in the memory to:
   register with the message server o activate the personal emergency application.

7. The mobile device of claim 1, wherein, when presenting the graphical representation, the processor is further configured to execute instructions in the memory to:
   present a location, from where another mobile device has sent the different text-based emergency message to the message server, in the context of a map of an area surrounding the location.

8. The mobile device of claim 1, wherein the processor is further configured to execute instructions in the memory to:
   present a dynamic challenge code that requires a user response before sending the fetch message request.

9. The mobile device of claim 1, wherein the processor is further configured to:
   receive user input to select a location reporting feature;
   generate, based on previously-configured criteria, a text-based tracking message that includes a location of the mobile device and a time of the tracking message; and
   send, to the message server, the text-based tracking message.

10. The mobile device of claim 9, wherein the previously-configured criteria includes one or more of:
    a particular time interval for sending the text-based tracking message, or
    a particular mobile device condition that triggers sending the text-based tracking message.

11. A method, comprising:
    receiving, by a mobile device, a unique identifier for a trusted recipient of text-based emergency messages;
    storing, by the mobile device, the unique identifier;
    receiving, by the mobile device, user input to select the trusted recipient;
    determining, by the mobile device, that a communications tower is unresponsive to non-emergency wireless signals;
    presenting, by the mobile device, a group of pre-configured status indicators;
    receiving, by the mobile device, user input to select a status indicator from the group of pre-configured status indicators;
    generating, by the mobile device, a text-based emergency message based on the selected trusted recipient, the selected status indicator, location information for the mobile device, and a time stamp;
    after the determining, sending, by the mobile device and to a message server, the text-based emergency message, wherein the text-based emergency message is sent using a dedicated emergency less spectrum for the communications tower,
    receiving user input to select a trusted originator of emergency messages;
    sending to the message server, a fetch message request to obtain different text-based emergency message, associated with the trusted originator, from the message server;
    receiving, from the message server, the different text-based emergency message; and
    presenting, to a user of the mobile device, a graphical representation of information included in the different text-based emergency message.

12. The method of claim 11, wherein the trusted recipient includes a mobile device associated with a particular first user, and wherein the trusted originator includes a mobile device associated with a particular second user.

13. The method of claim 11, further comprising:
    presenting a dynamic challenge code that requires a user response before sending the text-based emergency message; and presenting another dynamic challenge code that requires another user response before sending the fetch message request.

14. The method of claim 11, wherein the text-based emergency message is stored on the message server for retrieval upon request from the trusted recipient.

15. The method of claim 11, wherein the determining that the communications tower is unresponsive includes one or more of:
provinding a ping to test non-emergency frequencies associated with the communications tower,
detect a timed out request using the non-emergency frequencies, or
receiving, via a dedicated emergency channel, a notification to indicate a localized emergency.

16. A non-transitory computer-readable medium, including instructions executable by at least one processor, the non-transitory computer-readable medium comprising instructions for:
determining that a communications tower is unresponsive to non-emergency wireless signals;
receiving user input to select a recipient from a group of pre-registered recipients for an emergency message;
presenting a group of pre-configured status indicators;
receiving user input to select a status indicator from the group of pre-configured status indicators;
generating a text-based emergency message based on the selected recipient, the selected status indicator, location information for a mobile device, and a time stamp;
sending, after the determining and to a message server that is different than the message recipient, the text-based emergency message via a dedicated emergency wireless spectrum for the communications tower,
receiving user input to select an originator from a group of pre-registered originators of emergency messages;
sending to the message server that is different than the originator, a fetch message request to obtain, from the message server, a different text-based emergency message associated with the originator;
receiving, from the message server, the different text-based emergency message; and
presenting, to a user of the mobile device, a graphical representation of information included in the different text-based emergency message.

17. The non-transitory computer-readable medium of claim 16, further comprising one or more instructions for:
receiving user input to select a location reporting feature;
generating, based on previously-configured criteria, a text-based tracking message that includes a location of the mobile device and a time of the tracking message; and
sending, to the message server, the text-based tracking message.

18. The mobile device of claim 1, wherein the processor is further configured to execute instructions in the memory to:
present a first challenge-response test to determine use by a human operator before sending the text-based emergency message; and
present a second challenge-response test to determine use by a human operator before sending the fetch message request.

19. The mobile device of claim 1, wherein each recipient from the group of pre-registered recipients includes a mobile device associated with a particular user.

20. The non-transitory computer-readable medium of claim 16, further comprising one or more instructions for:
storing a personal emergency application that enables the sending the text-based emergency message using the dedicated emergency wireless spectrum; and
registering with the message server to activate the personal emergency application.

* * * * *